James J. Christie's Glass Bottle Mold
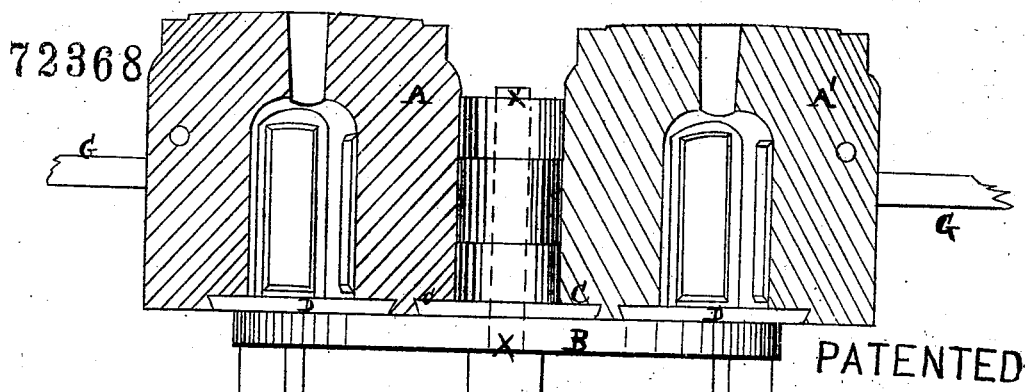
No. 72368
PATENTED DEC 17 1867
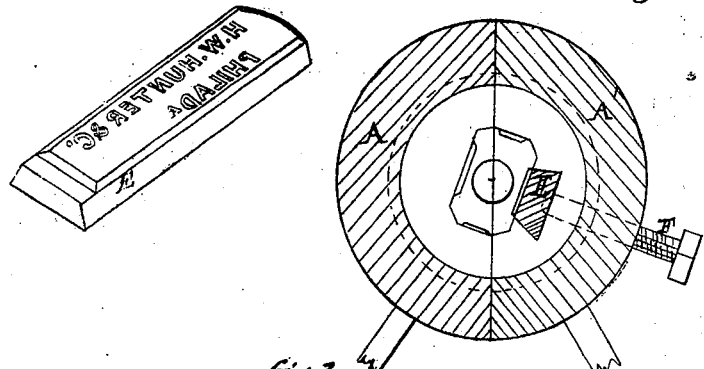
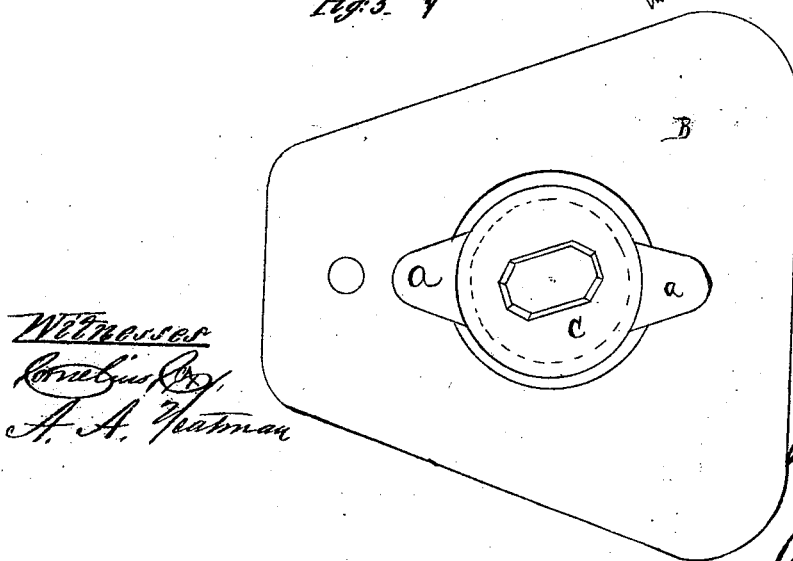
Witnesses
Cornelius Roy
A. A. Yeatman
Inventor
James J. Christie
per
Alexander J. Mason

UNITED STATES PATENT OFFICE.

JAMES J. CHRISTIE, OF BALTIMORE, MARYLAND.

IMPROVED GLASS-BOTTLE MOLD.

Specification forming part of Letters Patent No. 72,368, dated December 17, 1867.

*To all whom it may concern:*

Be it known that I, JAMES J. CHRISTIE, of Baltimore, in the county of Baltimore, and in the State of Maryland, have invented certain new and useful Improvements in Molds for Bottles or other Glassware; and do hereby declare that the following is a full, clear, and exact description thereof, reference being had to the accompanying drawings, and to the letters of reference marked thereon.

In the annexed drawings, making part of this specification, B represents the bed-plate of the mold. A and A' represent the two parts of the mold, which are hinged together and provided with two handles, G G, by means of which they are opened or closed. The bolt or pin which hinges the two parts of the mold together also connects them to the bed-plate, passing down through it. In the center of the bed-plate is a conical-shaped plug, which forms the bottom of the mold when it is closed. Each part of the mold is provided with a conical-shaped groove or recess, D, into which the edges of the plug C fit when the two parts are brought together around it. On each side of this plug are formed two openings or holes, a a, through the bed-plate. These openings are for the purpose of allowing the fine particles of glass to fall through, which drop upon the bed-plate, so as not to obstruct the working of the mold.

The internal construction of this mold is not different from that in general use, except that I use in one or both sides of it a movable panel or slide, E. This slide passes into a dovetailed groove, and is secured in position by means of a set-screw, F. The outer side or face of the slide or panel is flush with the opening or inner surface of the mold, and has inscribed upon it any letters or label or name which I wish to imprint upon the bottle or glassware to be molded. Should I desire to form letters upon each side of the bottle, or upon more than one side, I use as many panels as I desire—one for each side.

The glass is blown into this mold in the usual way.

It will readily be seen that there will be a great saving of expense and time by using only a few sizes of molds, so constructed that panels with any desirable inscription upon them can be used, instead of using a different mold for every new style of bottle which is to be molded.

Having thus fully described my invention, what I claim is—

1. The movable panel or slide E, used in combination with the mold, either upon its sides or bottom, and provided with suitable inscriptions, substantially as set forth.

2. The bed-plate B, provided with the openings a a, to allow of the escape of small particles of glass, substantially as herein set forth.

In testimony that I claim the foregoing I have hereunto set my hand this 10th day of October, 1867.

JAMES J. CHRISTIE.

Witnesses:
   A. W. MARR,
   CORNELIUS COX.